United States Patent
Shimada et al.

[11] Patent Number: 5,673,137
[45] Date of Patent: Sep. 30, 1997

[54] CONDENSER OPTICAL SYSTEM FOR LIGHT SCANNING SYSTEM

[75] Inventors: Katsumi Shimada; Hiromi Ishikawa; Sumihiro Nishihata; Masaru Noguchi, all of Kanagawa-ken, Japan

[73] Assignee: Fuji Photo Film Co., Ltd., Kanagawa, Japan

[21] Appl. No.: 600,174

[22] Filed: Feb. 12, 1996

[30] Foreign Application Priority Data

Feb. 14, 1995 [JP] Japan .................................. 7-024855

[51] Int. Cl.[6] .................................. G02B 26/10
[52] U.S. Cl. ...................... 359/206; 359/207; 359/208; 359/662; 347/259
[58] Field of Search .................. 359/205, 206, 359/207, 208, 215, 216, 217, 218, 219, 662, 727; 347/256, 258, 259

[56] References Cited

U.S. PATENT DOCUMENTS 4,847,492  7/1989  Houki ........................ 359/218

FOREIGN PATENT DOCUMENTS

| | | | |
|---|---|---|---|
| 64-84619 | 4/1986 | Japan | 359/208 |
| 64-35523 | 2/1989 | Japan . | |
| 1-77018 | 3/1989 | Japan | 359/206 |
| 1-101510 | 4/1989 | Japan . | |
| WO 92/04652 | 3/1992 | WIPO | 359/205 |

*Primary Examiner*—Paul M. Dzierzynski
*Assistant Examiner*—Darren E. Schuberg
*Attorney, Agent, or Firm*—Sughrue, Mion, Zinn, Macpeak & Seas, PLLC

[57] ABSTRACT

In a condenser optical system for a light scanning system, a single lens focuses a light beam deflected by a reflecting surface of a deflector onto a surface to be scanned and causes the deflected light to scan the surface in a main scanning direction at a constant speed. A cylindrical mirror which has a refracting power only in a sub-scanning direction normal to the main scanning direction compensates for surface tilt of the reflecting surface. At least one surface of the single lens is toric to compensate for the surface tilt associated with the cylindrical mirror and the toric surface is aspheric in a main-scanning cross-section.

8 Claims, 11 Drawing Sheets

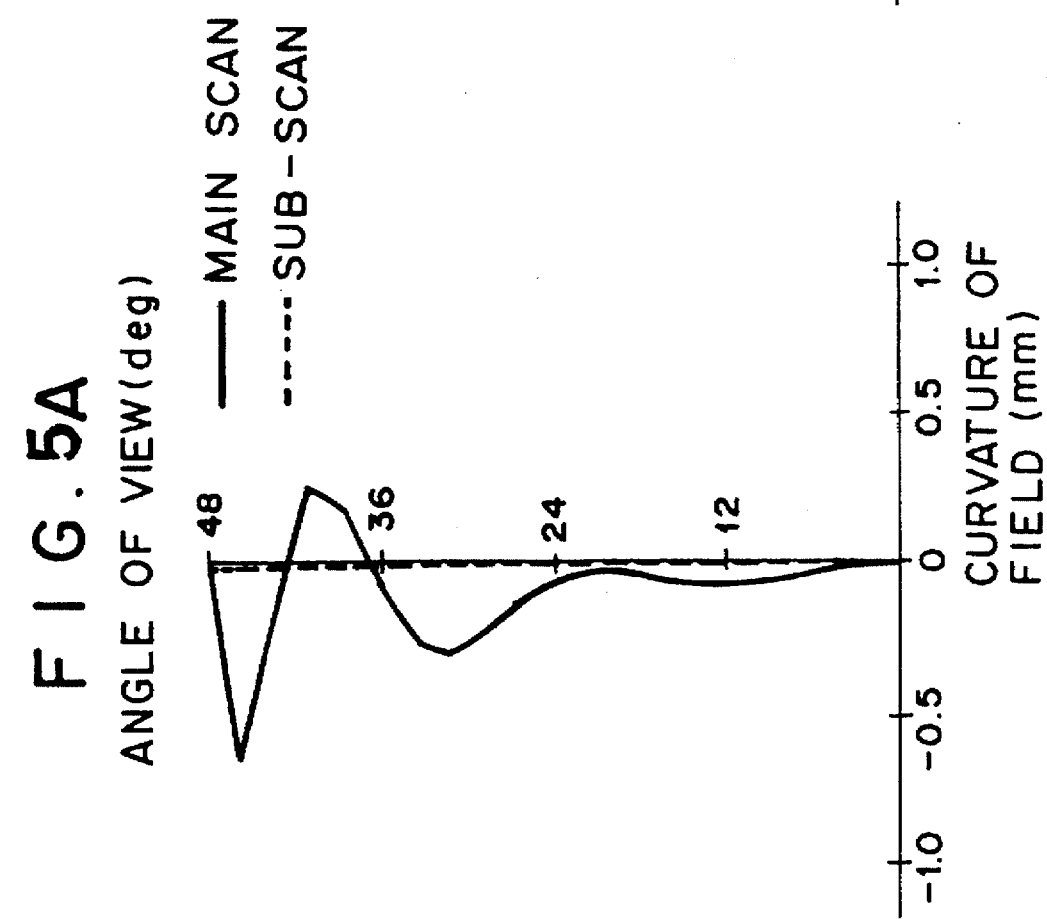

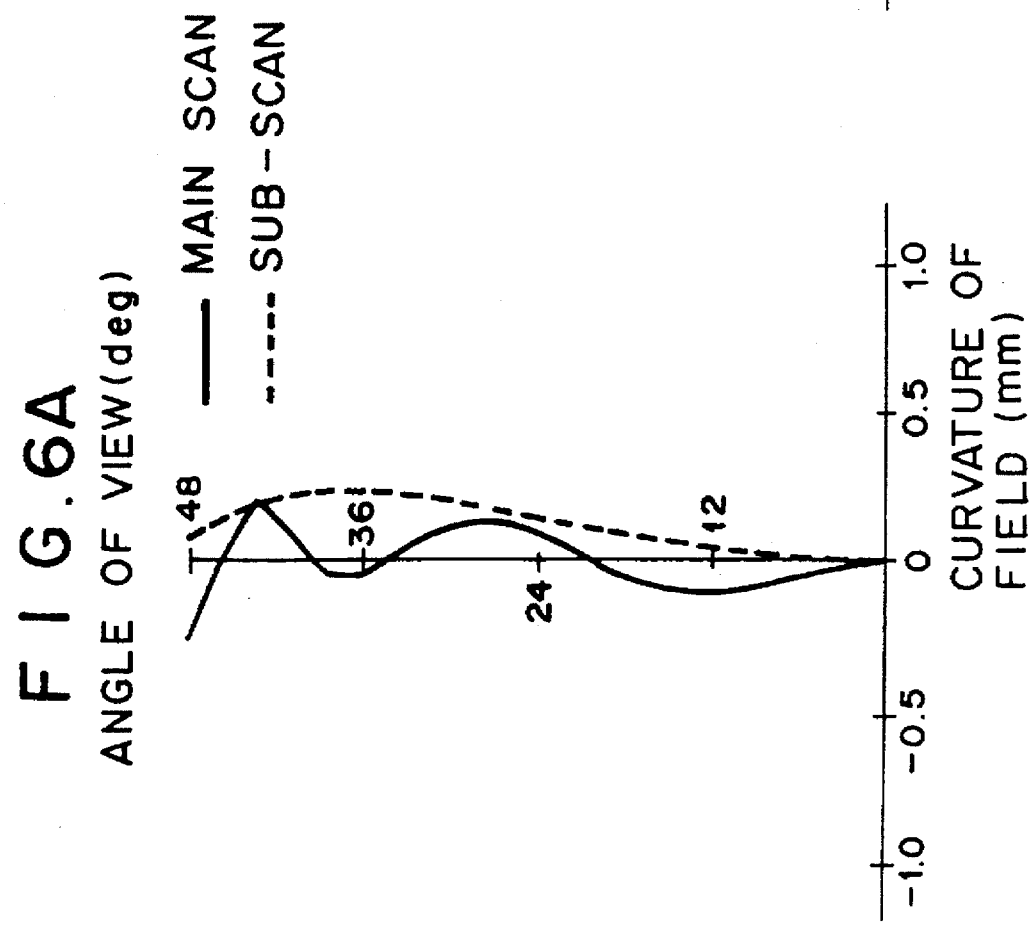

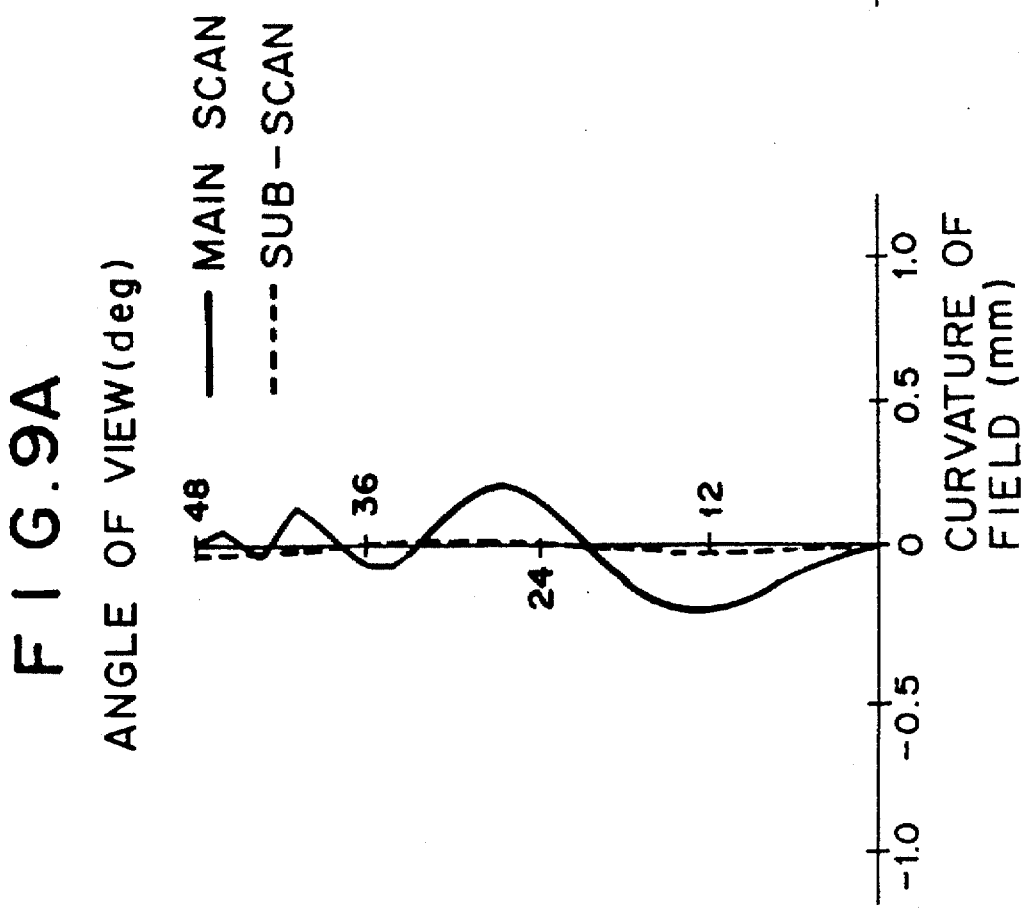

CONDENSER OPTICAL SYSTEM FOR LIGHT SCANNING SYSTEM

BACKGROUND OF THE INVENTION

1. Field of the Invention

This invention relates to a condenser optical system for use in a light scanning system which deflects a light beam such as a laser beam to scan a predetermined surface.

2. Description of the Related Art

There have been well known light scanning systems in which a light beam is deflected by a deflector such as a polygonal mirror or a galvanometer mirror to scan a surface.

In such light scanning systems, there has been a problem that the position of scanning spot fluctuate in the sub-scanning direction (a direction normal to the main scanning direction) on the surface to be scanned, which results in fluctuation in the scanning line spacing. In the case of a rotary polygonal mirror, error in parallelism of each reflecting surface relative to the rotational axis due to manufacturing accuracy causes the phenomenon, and in the case of a galvanometer mirror, wobbling of the mirror causes the phenomenon. In this specification, the error in parallelism of the reflecting surfaces and the wobbling of the galvanometer mirror will be referred to as "surface tilt", hereinbelow.

In order to compensate for the surface tilt, a tilt correcting optical system having a refracting power only in the sub-scanning direction is generally disposed in the optical path between the reflecting surface and the surface to be scanned.

The focal plane of the light beam deflected in the manner described is arcuate and when the light beam scans a flat surface, the diameter of the beam spot and/or scanning speed fluctuates in one scan. It has been well known to dispose a fθ lens or the like in the optical path between the reflecting surface and the surface to be scanned in order to prevent fluctuation in the diameter of the beam spot and in the scanning speed when the surface to be scanned is flat.

As the fθ lens, a single lens which is aspheric and axially symmetric is generally used as disclosed, for instance, in Japanese Unexamined Patent Publication No. 1(1989)-101510. Since such a single lens has the same refracting power in the main scanning direction as in the sub-scanning direction and the refracting power is set for preventing fluctuation in the scanning speed in the main direction, the single lens cannot perform compensation for surface tilt which requires a particular refracting power in the sub-scanning direction. Accordingly the surface tilt must be compensated for by use of an additional tilt correcting optical system such as a cylindrical lens, a cylindrical mirror or the like.

However recently scanning with a higher accuracy at a higher density has come to be required and compensation for the surface tilt must be effected with a higher accuracy. It is difficult to compensate for the surface tilt with a higher accuracy just with a cylindrical lens or a cylindrical mirror.

In the technique disclosed, for instance, in Japanese Unexamined Patent Publication No. 64(1989)-35523, the scanning condenser optical system comprises a cylindrical or toroidal lens as the tilt correcting optical system and an image-forming lens having a toric surface as the aforesaid single lens. The image-forming lens functions as a fθ lens in the main scanning direction and associates with the cylindrical lens to compensate for the surface tilt in the sub-scanning direction. This results in a better surface tilt compensation as compared with when the surface tilt is compensated for only by a cylindrical lens. However in order to guide the light beam to a surface to be scanned, a long mirror for changing the direction of travel of the light beam is required, which results in a larger number of parts.

SUMMARY OF THE INVENTION

In view of the foregoing observations and description, the primary object of the present invention is to provide a condenser optical system for a light scanning system which can compensate for the surface tilt with a high accuracy without increasing the number of parts and adding to the manufacturing cost.

In accordance with the present invention, there is provided a condenser optical system for a light scanning system comprising a single lens for focusing a deflected light beam onto a surface to be scanned and causing the deflected light to scan the surface in a main scanning direction at a constant speed, and a cylindrical mirror for compensating for surface tilt which has a refracting power only in a sub-scanning direction normal to the main scanning direction, wherein at least one surface of said single lens is toric to compensate for the surface tilt associated with the cylindrical mirror and the toric surface is aspheric in a main-scanning cross-section.

The term "main-scanning cross-section" means a cross-section along a plane defined by a trajectory of a path of the deflected light beam through the single lens (deflection plane).

It is preferred that said single lens satisfies the following formulae (2) to (5), $$0.3 \leq d2/d1 \leq 0.7 \quad (2)$$

$$0.4f \leq RX1 \leq 2.5f \quad (3)$$

$$-3.0 \times 10 f^6 \leq a1 \leq -5.0 f^6 \quad (4)$$

$$7.0 \times 10 f^6 \leq a2 \leq 6.0 \times 10^2 f^6 \quad (5)$$

when the focal length of said single lens is represented by f, the radius of curvature of the deflector side surface of said single lens in said main-scanning cross-section as measured on the optical axis is represented by RX1, the axial surface separation between a deflecting point on said reflecting surface and said single lens is represented by d1, the axial thickness of said single lens is represented by d2 and the deflector side aspheric surface of said single lens has a shape defined by the following formula $$z = ch^2/[1+\{1-(1+K)c^2h^2\}^{1/2}] + a1h^4 + a2h^6 + a3h^8 + a4h^{10} \quad (1)$$

wherein z represents the length of a perpendicular line between a point on an aspheric surface at a height of h above the optical axis and a plane tangent to the aspheric surface at the vertex of thereof (a plane perpendicular to the optical axis, h represents the height above the optical axis, c represents the curvature at the vertex of the aspheric surface (the reciprocal of the radius of curvature =1/RXi), K represents a conic constant and a1 to a4 respectively represents fourth-order, sixth-order, eighth-order and tenth-order aspheric coefficients.

That is, when d2/d1 is smaller than 0.3, the curvature of field becomes too large in the positive direction (overcorrection) and when d2/d1 is larger than 0.7, the curvature of field becomes too large in the negative direction (undercorrection). At the same time, the thickness of the single lens becomes too large and adds to the overall size of the optical system.

When RX1 is smaller than 0.4f, the fθ characteristic becomes too large in the negative direction, and when RX1 is larger than 2.5f, the fθ characteristic becomes too large in the positive direction.

When a1 is smaller than $-3.0\times10/f^3$ or a2 is smaller than $7.0\times10/f^5$, both the curvature of field and the fθ characteristic become too large in the positive direction to correct, and when a1 is larger than $-5.0/f^3$ or a2 is larger than $6.0\times10^2/f^5$, both the curvature of field and the fθ characteristic become too large in the negative direction to correct.

The deflecting angle of the light beam may be not smaller than 60° and accordingly said single lens may be formed of plastic material as well as glass material which is normally used.

In the condenser optical system of the present invention, the light beam deflected in a predetermined direction (the main scanning direction) by the deflector of the light scanning system, e.g., a rotating polygonal mirror or a galvanometer mirror, is focused on a predetermined surface to be scanned and caused to scan the surface at a constant speed in the main scanning direction by the single lens which may be, for instance, a fθ lens. The light beam passing through the single lens is guided to the surface by the cylindrical mirror. At this time, since the cylindrical mirror has a refracting power only in the sub-scanning direction, the cylindrical mirror does not affect the light beam in the scanning direction but merely reflect the light beam.

When there is a surface tilt in the reflecting surface of the deflector, the light beam is deflected in a direction which would lead the light beam to a position on the surface to be scanned deviated from the main scanning line in the sub-scanning direction. However the toric surface of the single lens corrects the direction of the light beam and the cylindrical mirror further corrects the direction of the light beam so that the light beam is focused accurately on the main scanning line.

Thus in accordance with the present invention, excellent fθ characteristic can be obtained over a wide range by virtue of a single lens at least one surface of which is toric and is aspheric in a main-scanning cross-section. In the sub-scanning direction, the surface tilt of the reflecting surface is compensated for and the scanning position of the light beam on the surface to be scanned is corrected by the single lens and the cylindrical mirror. Thus the surface tilt can be compensated for with a high accuracy without increasing the number of parts, whereby manufacturing cost is suppressed and the cumulative error in assembly can be suppressed.

Further in the optical system of the present invention, a good optical performance can be obtained even if the scanning angle (the deflecting angle) is 60° or more. When the scanning angle is large, the distance between the fθ lens and the image plane can be small, whereby the overall optical system can be arranged compactly.

Further when both the surfaces of said single lens are aspheric and the deflector side surface of said single lens is toric and convex toward the deflector in said main-scanning cross-section, more excellent fθ characteristic can be obtained over a wide range.

Further when the aforesaid formulae (2) to (5) are satisfied, the curvature of field and the fθ characteristic can be well corrected.

BRIEF DESCRIPTION OF THE DRAWINGS

FIG. 5A is a view showing the curvature of field of the condenser optical system of the third embodiment, FIG. 5B is a view showing fθ characteristic of the condenser optical system of the third embodiment, FIG. 6A is a view showing the curvature of field of the condenser optical system of the fourth embodiment, FIG. 6B is a view showing fθ characteristic of the condenser optical system of the, fourth embodiment, FIG. 9A is a view showing the curvature of field of the condenser optical system of the seventh embodiment, FIG. 9B is a view showing fθ characteristic of the condenser optical system of the seventh embodiment.

DESCRIPTION OF THE PREFERRED EMBODIMENT

Figure 1:
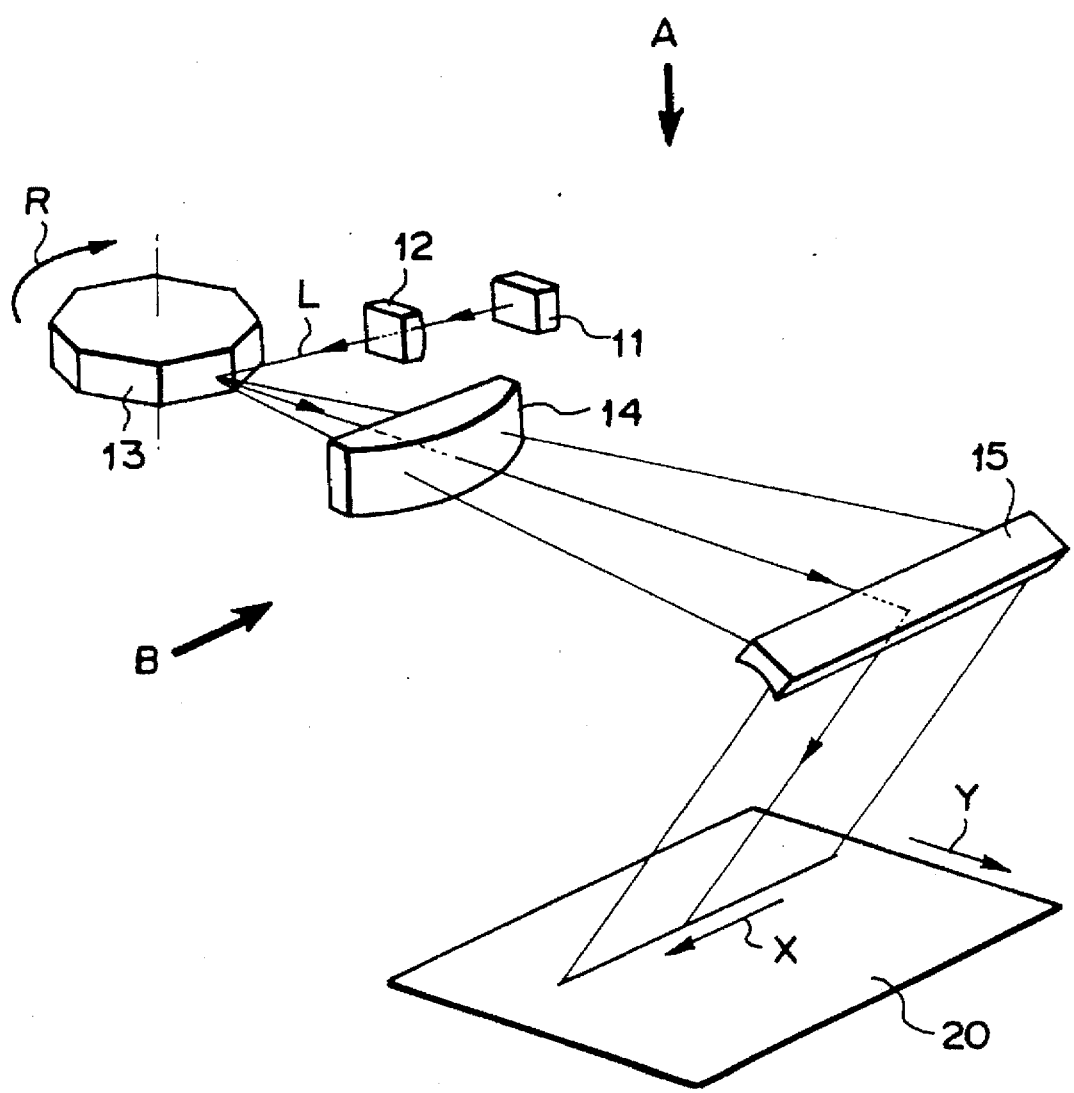
FIG. 1 is a schematic perspective view showing a light scanning system employing a condenser optical system in accordance with a first embodiment of the present invention.
Figure 2A:
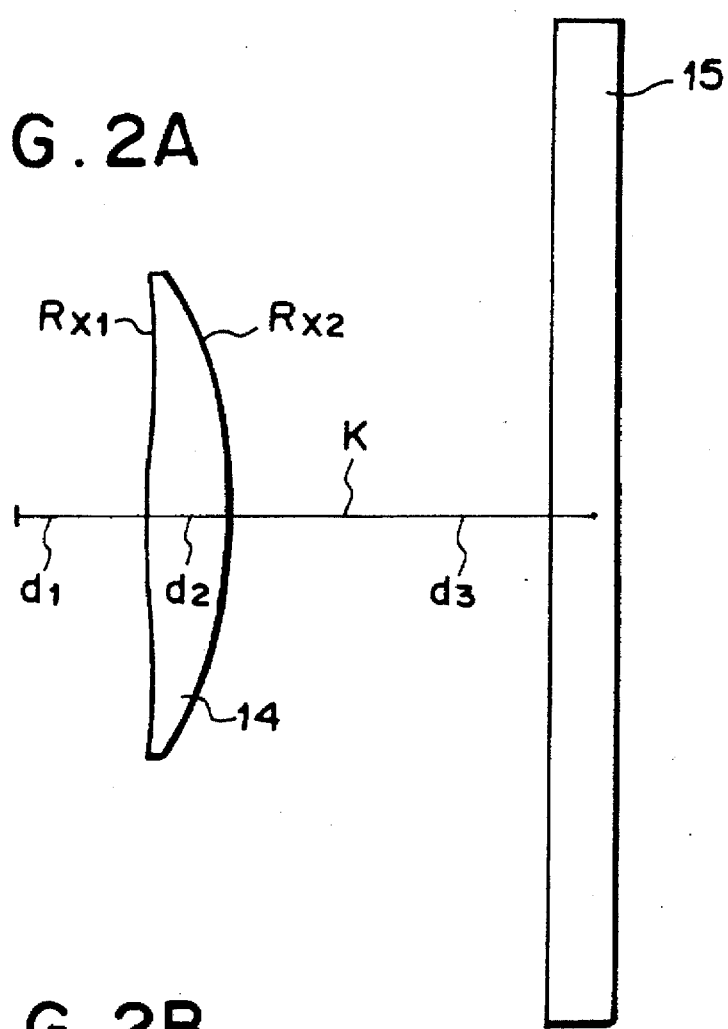
FIG. 2A is a view showing the condenser optical system of the first embodiment as viewed in the direction of arrow A in FIG. 1.

In FIGS. 1 and 2, a light scanning system comprises a laser 11 which emits a laser beam L, a cylindrical lens 12 which is convex toward the laser 11 and focuses the laser beam L onto a reflecting surface of a polygonal mirror 13 which is rotated about a rotational axis by an electric motor (not shown) and deflects the laser beam 11 in a predetermined direction, a fθ lens 14 of polymethyl methacrylate which focuses the deflected laser beam L onto a predetermined photosensitive material 20 and causes the leaser beam L to scan the material 20 at a constant speed in a main scanning direction X, and a cylindrical mirror 15 which reflects the laser beam L toward the photosensitive material 20 after passing through the fθ lens 14 and has a refracting power in a sub-scanning direction Y normal to the main scanning direction X to compensate for a surface tilt of the polygonal mirror 13 together with the fθ lens 14. At least one of entrance side and exit side surfaces of the fθ lens 14 is toric to compensate for the surface tilt associated with the cylindrical mirror 15 and the toric surface is aspheric in a main-scanning cross-section (FIG. 2A).

The photosensitive material 20 is conveyed in the sub-scanning direction Y by a conveyor means (not shown).

In the condenser optical system of this embodiment, the radii of curvature R (mm) of the surfaces of the fθ lens 14 and the reflecting surface of the cylindrical mirror 15, and the axial surface separations d (mm), that is, the distance between the reflecting surface and the entrance surface of the fθ lens 14, the axial thickness of the fθ lens 14, the distance between the exit surface of the fθ lens 14 and the reflecting surface of the cylindrical mirror 15 and the distance between the reflecting surface of the cylindrical mirror 15 and the surface to be scanned as measured along the optical axis, are as shown in the following table 1.

TABLE 1

| | R(mm) | | d(mm) | |
|---|---|---|---|---|
| | m/s dir. | s/s dir. | d1 = 19.212 | $n_d$ |
| RX1 = 92.04317* | | RY1 = −21.526 | | |
| K = −1.0 | | | | |
| a1 = −1.87886 × $10^{-5}$ | | | | |
| a2 = 3.36701 × $10^{-8}$ | | | | |
| a3 = −3.27172 × $10^{-11}$ | | | | |
| a4 = 1.27903 × $10^{-14}$ | | | | |
| | | | d2 = 9.606 | 1.49000 |
| RX2 = −102.062* | | RY2 = −27.171 | | |
| K = −1.0 | | | | |
| a1 = −8.65970 × $10^{-6}$ | | | | |
| a2 = 4.92182 × $10^{-10}$ | | | | |
| a3 = 8.80582 × $10^{-12}$ | | | | |
| a4 = −7.00818 × $10^{-15}$ | | | | |
| | | | d3 = 38.948 | |
| RX3 = ∞ | | RY3 = −87.763 | d4 = 57.636 | | focal length: 100 mm
angle of view: 96°
curvature of field (main scanning direction): 1.33 mm
curvature of field (sub-scanning direction): 0.67 mm
fθ characteristic: 1.6%

Figure 2B:
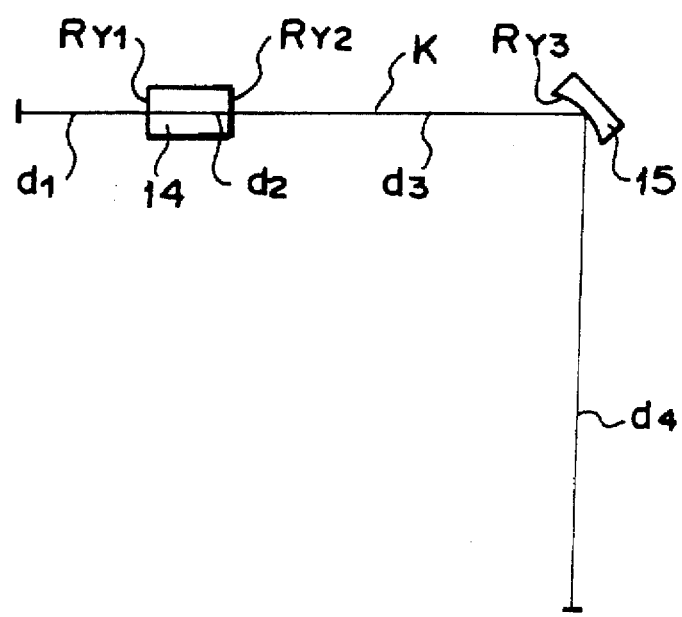
FIG. 2B is a view showing the condenser optical system of the first embodiment as viewed in the direction of arrow B in FIG. 1.

In table 1, radii of curvature RX1 to RX3 in the main scanning direction (abbreviated as m/s dir. in table 1) means the radii of curvature in a cross-section along a plane including the trajectory of the path of the deflected laser beam L (FIG. 2A) and radii of curvature RY1 to RY3 in the sub-scanning direction (abbreviated as s/s dir. in table 1) means the radii of curvature in a cross-section along a plane which includes the optical axis K and is normal to the plane including the trajectory of the path of the deflected laser beam L (FIG. 2B). Radii of curvature RX1 and RX2 in the main scanning direction of the surfaces of the fθ lens 14 are aspheric and the values attached with * are those measured along the optical axis at the vertex of the aspheric surface and mean that the aspheric surfaces have a shape defined by the following formula (1). The value of the radius of curvature is positive when the surface is convex toward the deflector and negative when it is convex toward the surface to be scanned.

$$z = ch^2/[1+\{1-(1+K)c^2h^2\}^{1/2}] + a1h^4 + a2h^6 + a3h^8 + a4h^{10} \quad (1)$$

wherein z represents the length of a perpendicular line between a point on an aspheric surface at a height of h above the optical axis and a plane tangent to the aspheric surface at the vertex of thereof (a plane perpendicular to the optical axis), h represents the height above the optical axis, c represents the curvature at the vertex of the aspheric surface (the reciprocal of the radius of curvature =1/RXi), K represents a conic constant and a1 to a4 respectively represents fourth-order, sixth-order, eighth-order and tenth-order aspheric coefficients.

As can be understood from table, in the optical system of this embodiment, both the surfaces of the fθ lens 14 are aspheric surfaces defined by the aforesaid formula (1) and the polygonal mirror side surface of the fθ lens 14 is toric and convex toward the polygonal mirror 13 in said main-scanning cross-section.

Further the optical system satisfies the following formulae (2) to (5).

$$0.3 \leq d2/d1 \leq 0.7 \quad (2)$$

$$0.4f \leq RX1 \leq 2.5f \quad (3)$$

$$-3.0 \times 10^{-8} f^3 \leq a1 \leq -5.0 \times 10^{-8} f^3 \quad (4)$$

$$7.0 \times 10^{-8} f^5 \leq a2 \leq 6.0 \times 10^{-7} f^5 \quad (5)$$

wherein f represents the focal length (mm) of the fθ lens 14, RX1 represents the radius of curvature of the polygonal mirror side surface of the fθ lens in said main-scanning cross-section as measured on the optical axis, d1 represents the axial surface separation between the reflecting surface of the polygonal mirror 13 and the entrance surface of the fθ lens 14, d2 represents the axial thickness of the fθ lens 14 and a1 and a2 respectively represents fourth-order and sixth-order aspheric coefficients of the aspheric surface defined by formula (1).

In the condenser optical system of this embodiment, the laser beam L emitted from the laser 11 is focused on the reflecting surface of the polygonal mirror 13 as a line image by the cylindrical lens 12.

The laser beam L deflected by the reflecting surface of the polygonal mirror 13 passes through the fθ lens 14, is reflected by the cylindrical mirror 15 and is led to the surface of photosensitive material 20 to form a scanning spot. Since the polygonal mirror 13 is rotated a high speed in the direction of arrow R (FIG. 1), the scanning spot repeatedly scans the surface of the material 20 in the direction of X (the main scanning) while the photosensitive material 20 is conveyed in the direction of Y (the sub-scanning). That is, the scanning spot scan the surface two-dimensionally.

The laser beam L deflected by the polygonal mirror 13 is caused to scan the surface of the photosensitive material 20 in the main scanning direction at a constant speed by the fθ lens 14. When there is a surface tilt in the reflecting surface of the polygonal mirror 13, the laser beam L is deflected in a direction which would lead the laser beam L to a position deviated from the main scanning line in the sub-scanning direction. However the toric surface of the fθ lens 14 partly corrects the direction of the laser beam L and the cylindrical mirror 15 further corrects the direction of the laser beam L so that the laser beam L is focused accurately on the main scanning line.

Thus in accordance with the present invention, by correcting the surface tilt of the reflecting surface partly by the fθ lens 14 and partly by the cylindrical mirror 15. the surface tilt can be compensated for with a high accuracy without increasing the number of parts, whereby manufacturing cost is suppressed. When the number of parts is increased, the cumulative error in assembly increases. However since the condenser optical system of the present invention is equivalent to the conventional condenser optical system for the light scanning system in number, the cumulative error is not increased.

Figure 3B:
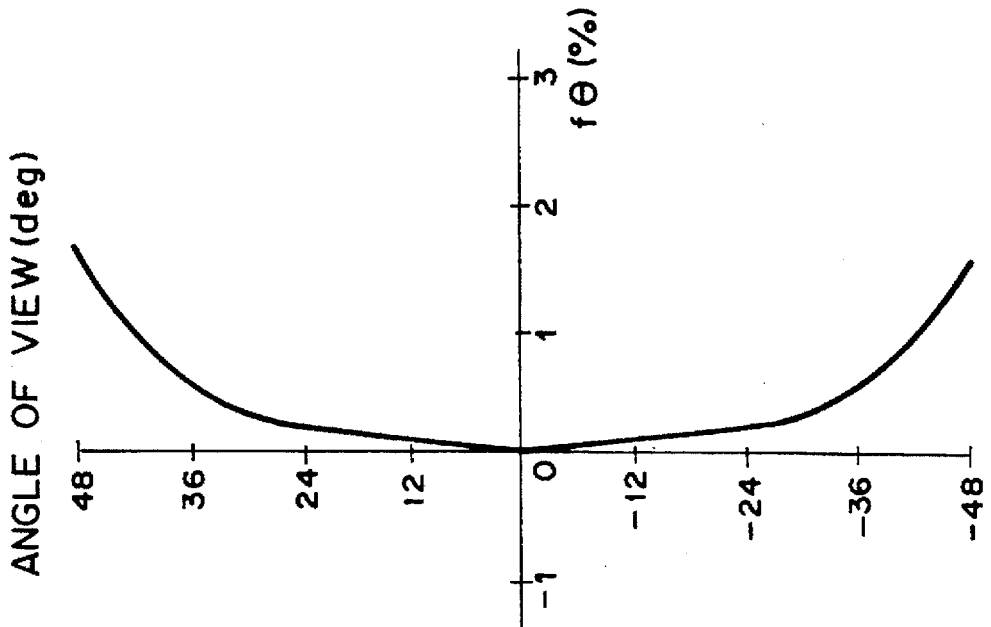
FIG. 3B is a view showing fθ characteristic of the condenser optical system of the first embodiment.
Figure 3A:
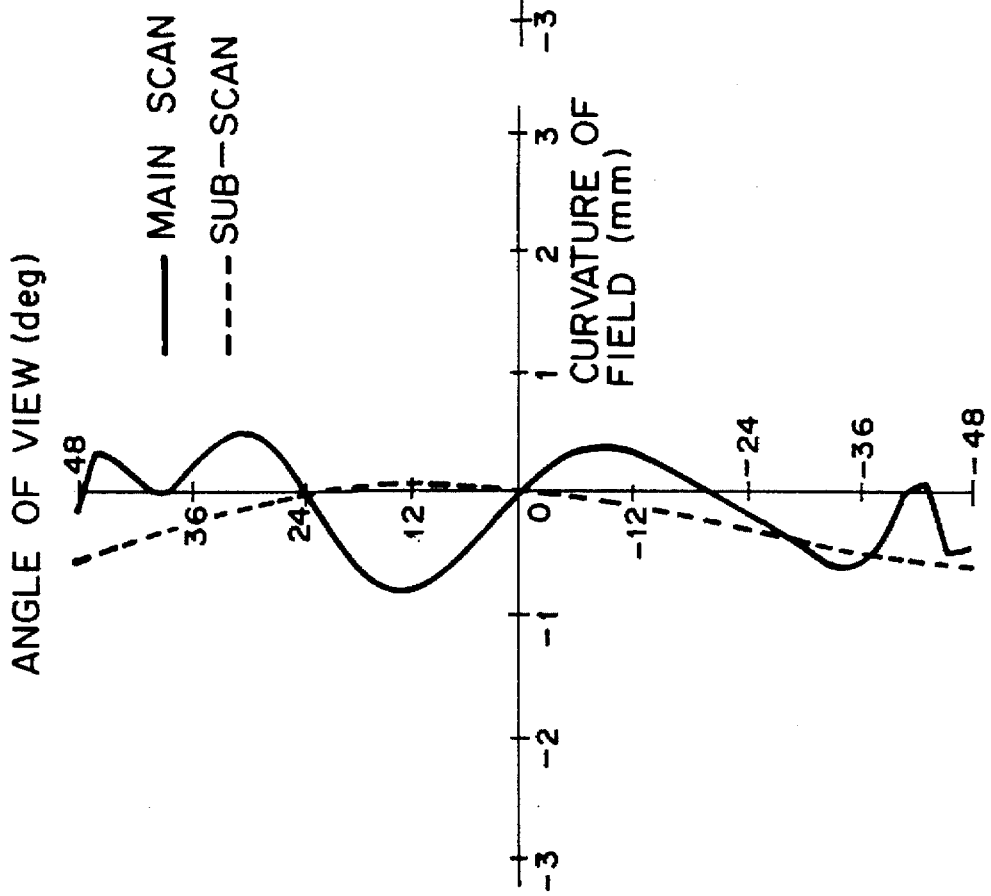
FIG. 3A is a view showing the curvature of field of the condenser optical system of the first embodiment.

FIGS. 3A and 3B respectively show the curvature of field and the fθ characteristics of the condenser optical system of the embodiment described above. As can be understood from FIGS. 3A and 3B, the optical system of the embodiment is well corrected in aberration.

Second to ninth embodiments of the present invention will be described, hereinbelow. The arrangement of the elements of the condenser optical systems in accordance with the second to ninth embodiments are substantially the same as the first embodiment described above and accordingly will not be described here. Also in the optical systems of the second to ninth embodiments, both the surfaces of the fθ lens 14 are aspheric surfaces defined by the aforesaid formula (1) and the polygonal mirror side surface of the fθ lens 14 is toric and convex toward the polygonal mirror 13 in said main-scanning cross-section.

Further the optical systems satisfy the aforesaid formulae (2) to (5).

The radii of curvature R (mm) of the surfaces of the fθ lens 14 and the reflecting surface of the cylindrical mirror 15, the axial surface separations d (mm), and the refractive index $n_d$ for sodium d-line of the fθ lens 14 in the condenser optical system of the second embodiment are shown in the following table 2.

TABLE 2

| R(mm) | | d(mm) | |
|---|---|---|---|
| m/s dir. | s/s dir. | d1 = 19.163 | $n_d$ |
| RX1 = 77.342* | RY1 = −19.726 | | |
| K = −1.0000 | | | |
| a1 = −1.93176 × 10⁻⁵ | | | |
| a2 = 3.69720 × 10⁻⁸ | | | |
| a3 = −4.27706 × 10⁻¹¹ | | | |
| a4 = 1.77484 × 10⁻¹⁴ | | | |
| | | d2 = 9.581 | 1.52540 |
| RX2 = −155.764* | RY2 = −29.306 | | |
| K = −1.0000 | | | |
| a1 = −8.89372 × 10⁻⁶ | | | |
| a2 = 2.63453 × 10⁻⁹ | | | |
| a3 = 8.19692 × 10⁻¹² | | | |
| a4 = −1.14993 × 10⁻¹⁴ | | d3 = 34.014 | |
| RX3 = ∞ | RY3 = −86.673 | | |
| | | d4 = 61.721 | | focal length: 100 mm
angle of view: 96°
curvature of field (main scanning direction): 0.40 mm
curvature of field (sub-scanning direction): 0.02 mm
fθ characteristic: 0.10%

Figure 4B:
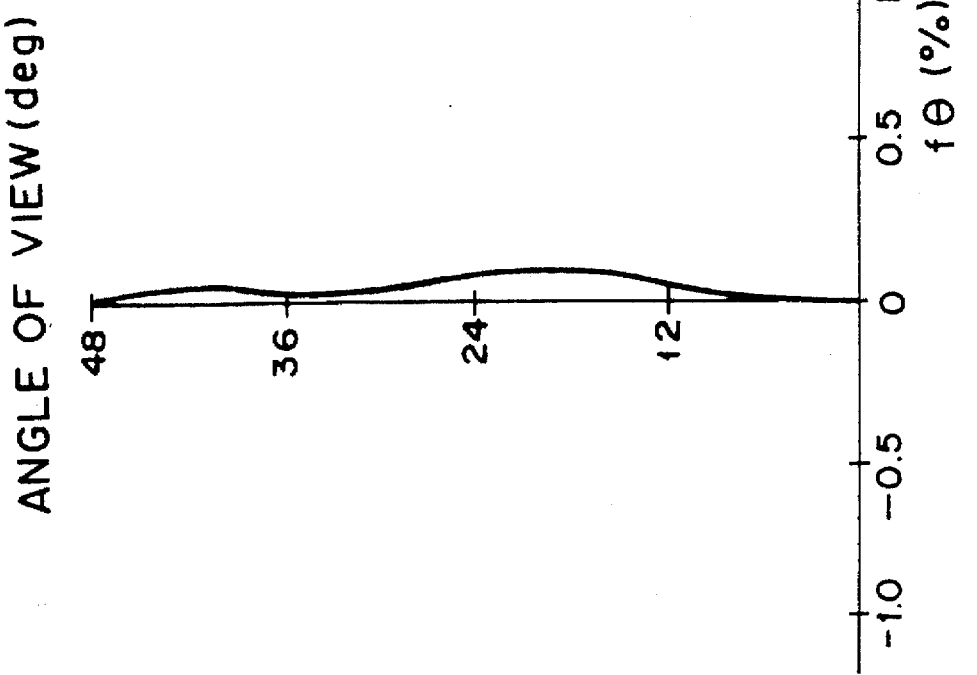
FIG. 4B is a view showing fθ characteristic of the condenser optical system of the second embodiment.
Figure 4A:
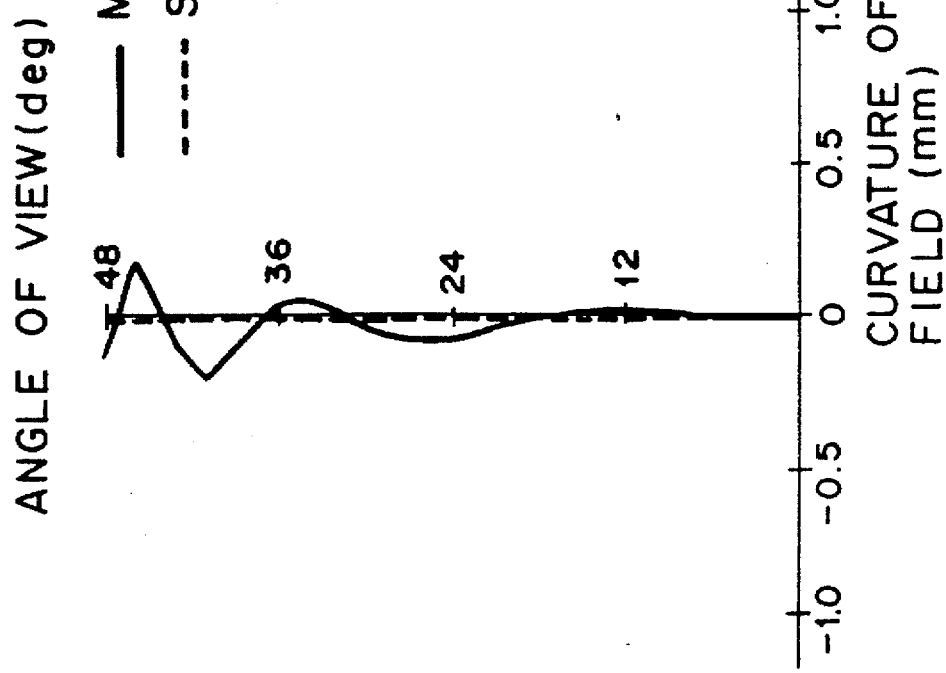
FIG. 4A is a view showing the curvature of field of the condenser optical system of the second embodiment.

FIGS. 4A and 4B respectively show the curvature of field and the fθ characteristics of the condenser optical system of this embodiment. As can be understood from FIGS. 4A and 4B, the optical system of this embodiment is well corrected in aberration.

The radii of curvature R (mm) of the surfaces of the fθ lens 14 and the reflecting surface of the cylindrical mirror 15, the axial surface separations d (mm), and the refractive index $n_d$ for sodium d-line of the fθ lens 14 in the condenser optical system of the third embodiment are shown in the following table 3.

TABLE 3

| R(mm) | | d(mm) | |
|---|---|---|---|
| m/s dir. | s/s dir. | d1 = 16.817 | $n_d$ |
| RX1 = 57.659* | RY1 = −17.508 | | |
| K = −0.894716 | | | |
| a1 = −2.54043 × 10⁻⁵ | | | |
| a2 = 4.70721 × 10⁻⁸ | | | |
| a3 = −4.34991 × 10⁻¹¹ | | | |
| a4 = 1.57895 × 10⁻¹⁴ | | | 1.52540 |
| | | d2 = 9.610 | |
| RX2 = −557.834* | RY2 = −27.382 | | |
| K = −39.977625 | | | |
| a1 = −1.03129 × 10⁻⁵ | | | |

TABLE 3-continued

| R(mm) | | d(mm) | |
|---|---|---|---|
| m/s dir. | s/s dir. | d1 = 16.817 | $n_d$ |
| a2 = 5.38161 × 10⁻¹⁰ | | | |
| a3 = 1.44859 × 10⁻¹¹ | | | |
| a4 = −9.98782 × 10⁻¹⁵ | | d3 = 34.373 | |
| RX3 = ∞ | RY3 = −83.948 | | |
| | | d4 = 59.887 | | focal length: 100 mm
angle of view: 96°
curvature of field (main scanning direction): 0.92 mm
curvature of field (sub-scanning direction): 0.03 mm
fθ characteristic: 0.45%

FIGS. 5A and 5B respectively show the curvature of field and the fθ characteristics of the condenser optical system of this embodiment. As can be understood from FIGS. 5A and 5B, the optical system of this embodiment is well corrected in aberration.

The radii of curvature R (mm) of the surfaces of the fθ lens 14 and the reflecting surface of the cylindrical mirror 15, the axial surface separations d (mm), and the refractive index $n_d$ for sodium d-line of the fθ lens 14 in the condenser optical system of the fourth embodiment are shown in the following table 4. In the fourth embodiment, a2 is set close to the upper limit in formula (5).

TABLE 4

| R(mm) | | d(mm) | |
|---|---|---|---|
| m/s dir. | s/s dir. | d1 = 16.821 | $n_d$ |
| RX1 = 72.089* | RY1 = −16.730 | | |
| K = −4.249363 | | | |
| a1 = −2.54583 × 10⁻⁵ | | | |
| a2 = 5.85603 × 10⁻⁸ | | | |
| a3 = −9.74965 × 10⁻¹¹ | | | |
| a4 = 5.98949 × 10⁻¹⁴ | | | |
| | | d2 = 9.612 | 1.52540 |
| RX2 = −184.849* | RY2 = −29.666 | | |
| K = 10.759236 | | | |
| a1 = −1.13622 × 10⁻⁵ | | | |
| a2 = 5.01412 × 10⁻⁹ | | | |
| a3 = 4.37845 × 10⁻¹² | | | |
| a4 = −1.77010 × 10⁻¹⁴ | | | |
| | | d3 = 32.368 | |
| RX3 = ∞ | RY3 = −83.631 | | |
| | | d4 = 63.039 | | focal length: 100 mm
angle of view: 96°
curvature of field (main scanning direction): 0.47 mm
curvature of field (sub-scanning direction): 0.23 mm
fθ characteristic: 0.41%

FIGS. 6A and 6B respectively show the curvature of field and the fθ characteristics of the condenser optical system of this embodiment. As can be understood from FIGS. 6A and 6B, the optical system of this embodiment is well corrected in aberration.

The radii of curvature R (mm) of the surfaces of the fθ lens 14 and the reflecting surface of the cylindrical mirror 15, the axial surface separations d (mm), and the refractive index $n_d$ for sodium d-line of the fθ lens 14 in the condenser optical system of the fifth embodiment are shown in the following table 5. In the fifth embodiment, d2/d1, RX1, a1 and a2 are set close to the upper limits in formulae (2) to (5).

TABLE 5

| | R(mm) | | d(mm) | |
|---|---|---|---|---|
| m/s dir. | | s/s dir. | $d1 = 23.979$ | $n_d$ |
| $RX1 = 232.653*$<br>$K = -90.760799$<br>$a1 = -5.04544 \times 10^{-6}$<br>$a2 = 9.95548 \times 10^{-9}$<br>$a3 = -1.11626 \times 10^{-11}$<br>$a4 = 3.99824 \times 10^{-15}$ | | $RY1 = -24.580$ | | |
| | | | $d2 = 16.786$ | 1.52540 |
| $RX2 = -66.180*$<br>$K = -0.673916$<br>$a1 = -2.38346 \times 10^{-6}$<br>$a2 = -4.03697 \times 10^{-10}$<br>$a3 = 2.80184 \times 10^{-12}$<br>$a4 = -2.46082 \times 10^{-15}$ | | $RY2 = -41.117$ | | |
| | | | $d3 = 29.014$ | |
| $RX3 = \infty$ | | $RY3 = -96.350$ | | |
| | | | $d4 = 68.501$ | | focal length: 100 mm
angle of view: 96°
curvature of field (main scanning direction): 0.86 mm
curvature of field (sub-scanning direction): 0.02 mm
fθ characteristic: 0.27%

Figures 7A, 7B:
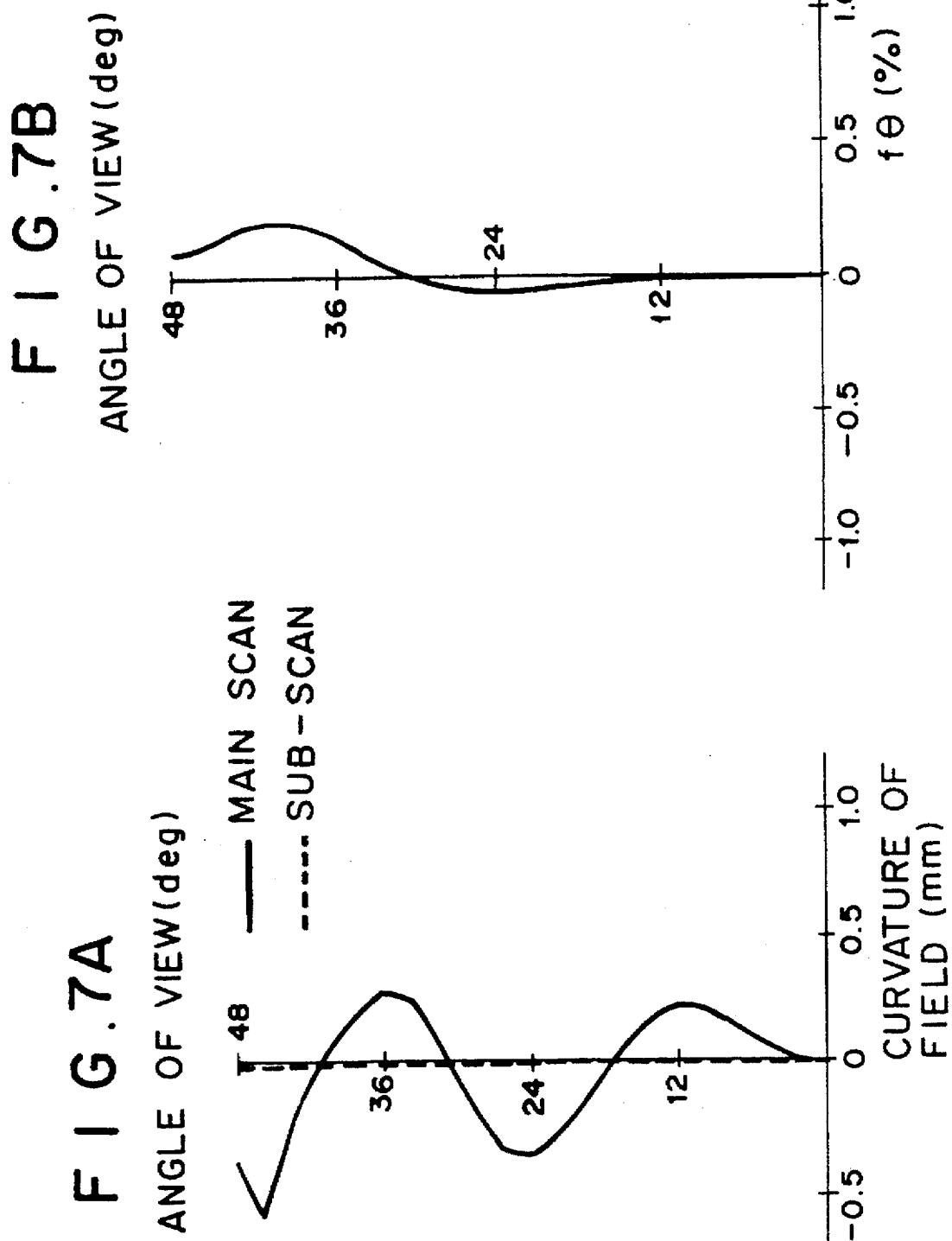
FIG. 7A is a view showing the curvature of field of the condenser optical system of the fifth embodiment.
FIG. 7B is a view showing fθ characteristic of the condenser optical system of the fifth embodiment.

FIGS. 7A and 7B respectively show the curvature of field and the fθ characteristics of the condenser optical system of this embodiment. As can be understood from FIGS. 7A and 7B, the optical system of this embodiment is well corrected in aberration.

The radii of curvature R (mm) of the surfaces of the fθ lens 14 and the reflecting surface of the cylindrical mirror 15, the axial surface separations d (mm), and the refractive index $n_d$ for sodium d-line of the fθ lens 14 in the condenser optical system of the sixth embodiment are shown in the following table 6. In the sixth embodiment, d2/d1 is set close to the lower limit in formula (2).

TABLE 6

| | R(mm) | | d(mm) | |
|---|---|---|---|---|
| m/s dir. | | s/s dir. | $d1 = 19.342$ | $n_d$ |
| $RX1 = 68.522*$<br>$K = -1.635426$<br>$a1 = -2.64237 \times 10^{-5}$<br>$a2 = 4.81462 \times 10^{-8}$<br>$a3 = -4.58557 \times 10^{-11}$<br>$a4 = 1.68908 \times 10^{-14}$ | | $RY1 = -19.941$ | | |
| | | | $d2 = 7.148$ | 1.52540 |
| $RX2 = -217.167*$<br>$K = 48.185258$<br>$a1 = -1.41611 \times 10^{-5}$<br>$a2 = 5.55812 \times 10^{-9}$<br>$a3 = 1.32085 \times 10^{-11}$<br>$a4 = -1.32668 \times 10^{-14}$ | | $RY2 = -27.321$ | | |
| | | | $d3 = 35.931$ | |
| $RX3 = \infty$ | | $RY3 = -85.495$ | | |
| | | | $d4 = 61.016$ | | focal length: 100 mm
angle of view: 96°
curvature of field (main scanning direction): 0.78 mm
curvature of field (sub-scanning direction): 0.03 mm
fθ characteristic: 1.47%

Figure 8B:
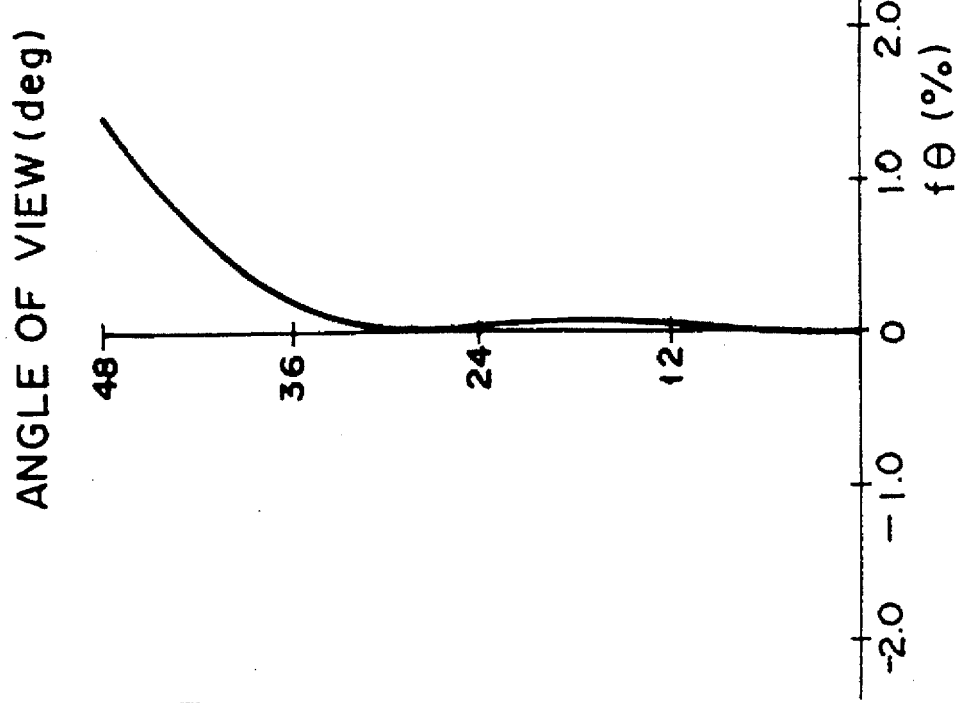
FIG. 8B is a view showing fθ characteristic of the condenser optical system of the sixth embodiment.
Figure 8A:
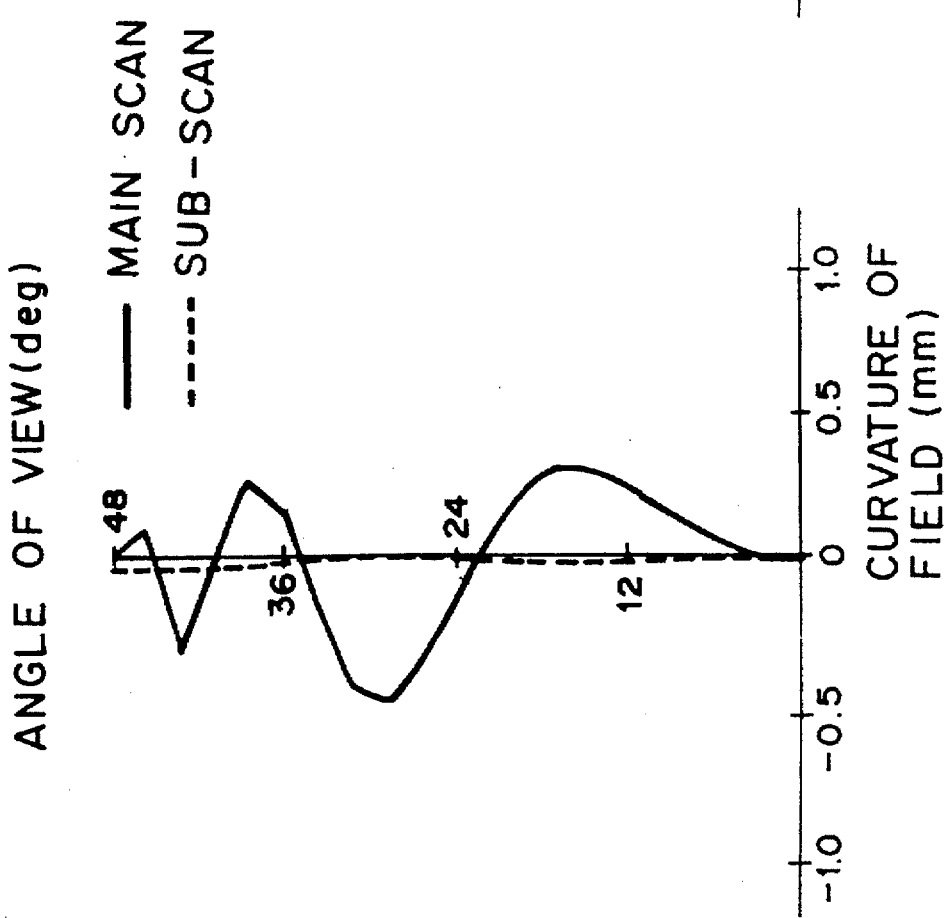
FIG. 8A is a view showing the curvature of field of the condenser optical system of the sixth embodiment.

FIGS. 8A and 8B respectively show the curvature of field and the fθ characteristics of the condenser optical system of this embodiment for a laser beam of 633 nm. As can be understood from FIGS. 8A and 8B, the optical system of this embodiment is well corrected in aberration.

The radii of curvature R (mm) of the surfaces of the fθ lens 14 and the reflecting surface of the cylindrical mirror 15, the axial surface separations d (mm), and the refractive index $n_d$ for sodium d-line of the fθ lens 14 in the condenser optical system of the seventh embodiment are shown in the following table 7. In the seventh embodiment, RX1 is set close to the lower limit in formula (3).

TABLE 7

| | R(mm) | | d(mm) | |
|---|---|---|---|---|
| m/s dir. | | s/s dir. | $d1 = 16.679$ | $n_d$ |
| $RX1 = 45.273*$<br>$K = -1.073165$<br>$a1 = -2.62615 \times 10^{-5}$<br>$a2 = 5.01677 \times 10^{-8}$<br>$a3 = -4.47101 \times 10^{-11}$<br>$a4 = 1.68102 \times 10^{-14}$ | | $RY1 = -17.786$ | | |
| | | | $d2 = 9.53$ | 1.52540 |
| $RX2 = 303.579*$<br>$K = 62.726776$<br>$a1 = -1.05846 \times 10^{-5}$<br>$a2 = 1.61355 \times 10^{-9}$<br>$a3 = 1.58667 \times 10^{-11}$<br>$a4 = -9.70741 \times 10^{-15}$ | | $RY2 = -28.191$ | | |
| | | | $d3 = 33.632$ | |
| $RX3 = \infty$ | | $RY3 = -82.554$ | | |
| | | | $d4 = 59.117$ | | focal length: 100 mm
angle of view: 96°
curvature of field (main scanning direction): 0.45 mm
curvature of field (sub-scanning direction): 0.04 mm
fθ characteristic: 0.84%

FIGS. 9A and 9B respectively show the curvature of field and the fθ characteristics of the condenser optical system of this embodiment. As can be understood from FIGS. 9A and 9B, the optical system of this embodiment is well corrected in aberration.

The radii of curvature R (mm) of the surfaces of the fθ lens 14 and the reflecting surface of the cylindrical mirror 15, the axial surface separations d (mm), and the refractive index $n_d$ for sodium d-line of the fθ lens 14 in the condenser optical system of the eighth embodiment are shown in the following table 8. In the eighth embodiment, a2 is set close to the lower limit in formula (5).

TABLE 8

| | R(mm) | | d(mm) | |
|---|---|---|---|---|
| m/s dir. | | s/s dir. | $d1 = 21.445$ | $n_d$ |
| $RX1 = 149.770*$<br>$K = -157.454487$<br>$a1 = -5.56788 \times 10^{-6}$<br>$a2 = 7.61319 \times 10^{-9}$<br>$a3 = -4.53461 \times 10^{-12}$<br>$a4 = 1.42388 \times 10^{-15}$ | | $RY1 = -21.996$ | | |
| | | | $d2 = 11.914$ | 1.2540 |
| $RX2 = -78.714*$<br>$K = 2.152475$<br>$a1 = -4.42872 \times 10^{-6}$<br>$a2 = 2.67526 \times 10^{-9}$<br>$a3 = -1.65850 \times 10^{-12}$<br>$a4 = -1.70761 \times 10^{-15}$ | | $RY2 = -34.817$ | | |
| | | | $d3 = 32.299$ | |
| $RX3 = \infty$ | | $RY3 = -90.635$ | | |
| | | | $d4 = 64.962$ | | focal length: 100 mm
angle of view: 96°
curvature of field (main scanning direction): 0.22 mm
curvature of field (sub-scanning direction): 0.04 mm
fθ characteristic: 1.35%

Figure 10B:
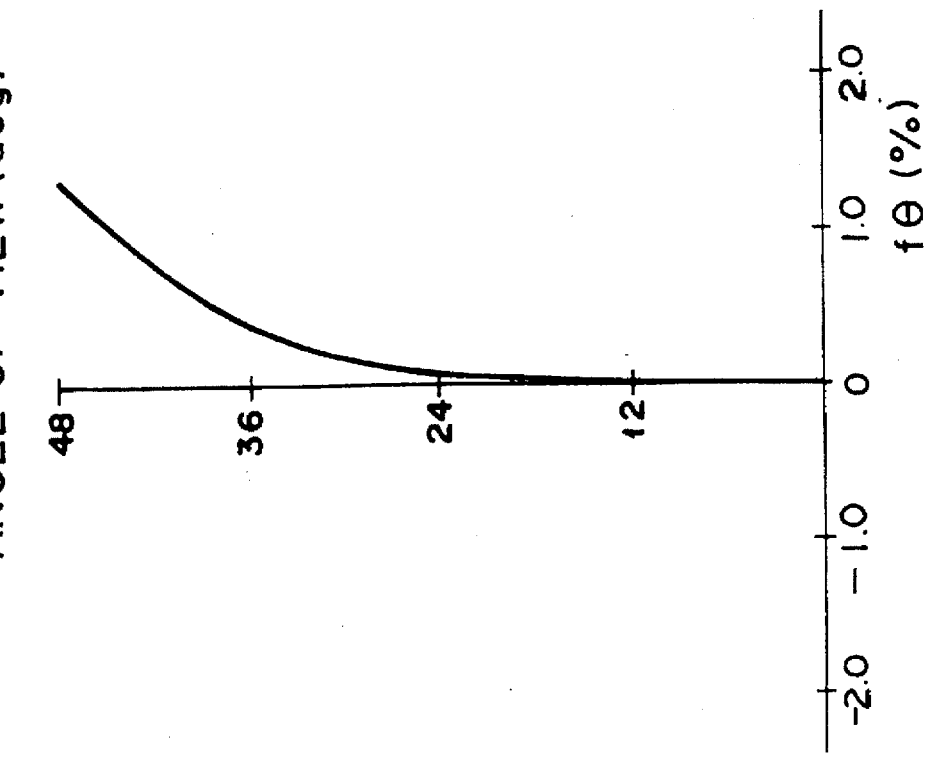
FIG. 10B is a view showing fθ characteristic of the condenser optical system of the eighth embodiment.
Figure 10A:
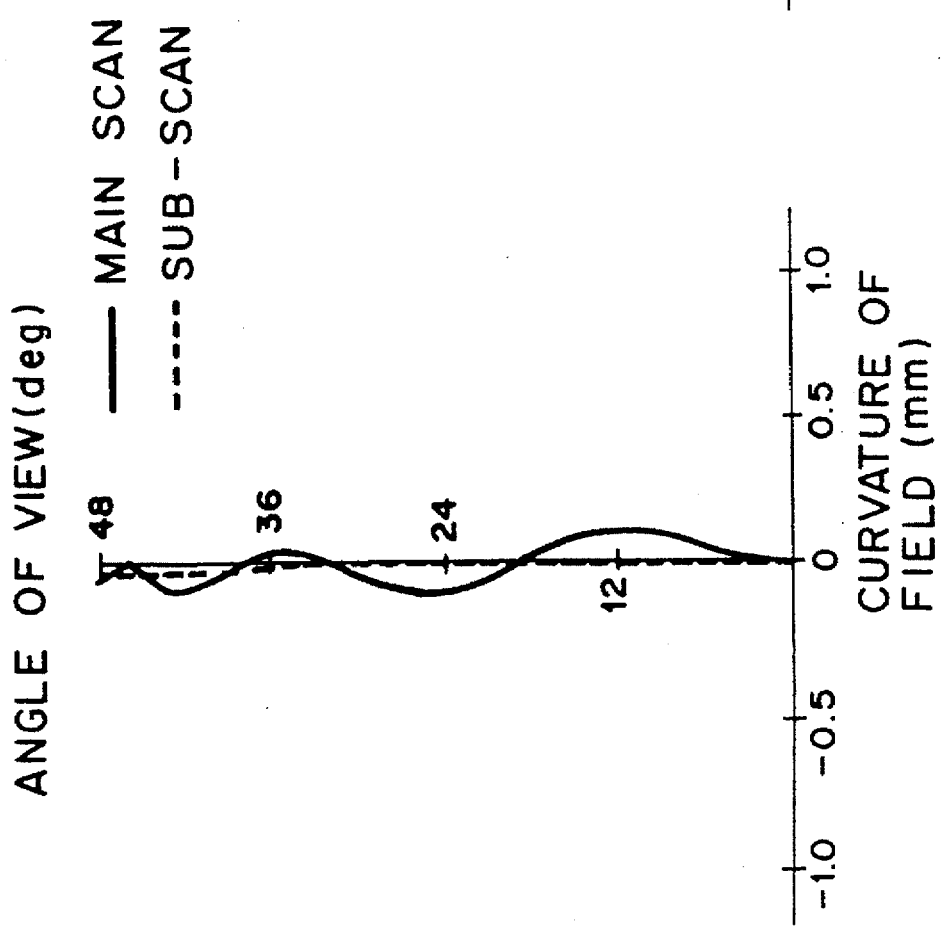
FIG. 10A is a view showing the curvature of field of the condenser optical system of the eighth embodiment.

FIGS. 10A and 10B respectively show the curvature of field and the fθ characteristics of the condenser optical system of this embodiment. As can be understood from FIGS. 10A and 10B, the optical system of this embodiment is well corrected in aberration.

The radii of curvature R (mm) of the surfaces of the fθ lens 14 and the reflecting surface of the cylindrical mirror 15, the axial surface separations d (mm), and the refractive index $n_d$ for sodium d-line of the fθ lens 14 in the condenser optical system of the ninth embodiment are shown in the following table 9. In the ninth embodiment, a1 is set close to the lower limit in formula (4).

TABLE 9

| | R(mm) | | d(mm) | |
|---|---|---|---|---|
| m/s dir. | s/s dir. | | d1 = 15.792 | $n_d$ |
| RX1 = 66.386* | RY1 = −16.357 | | | |
| K = −5.338393 | | | | |
| a1 = −2.71758 × 10$^{-5}$ | | | | |
| a2 = 5.18844 × 10$^{-8}$ | | | | |
| a3 = −4.28023 × 10$^{-11}$ | | | | |
| a4 = 3.55670 × 10$^{-15}$ | | | | |
| | | | d2 = 9.524 | 1.58400 |
| RX2 = −459.790* | RY2 = −25.876 | | | |
| K = 337.913884 | | | | |
| a1 = −1.22118 × 10$^{-5}$ | | | | |
| a2 = 2.49342 × 10$^{-9}$ | | | | |
| a3 = 1.38846 × 10$^{-11}$ | | | | |
| a4 = −1.08347 × 10$^{-14}$ | | | | |
| | | | d3 = 35.218 | |
| RX3 = ∞ | RY3 = −83.578 | | | |
| | | | d4 = 59.492 | | focal length: 100 mm
angle of view: 96°
curvature of field (main scanning direction): 0.35 mm
curvature of field (sub-scanning direction): 0.02 mm
fθ characteristic: 0.84%

Figure 11B:
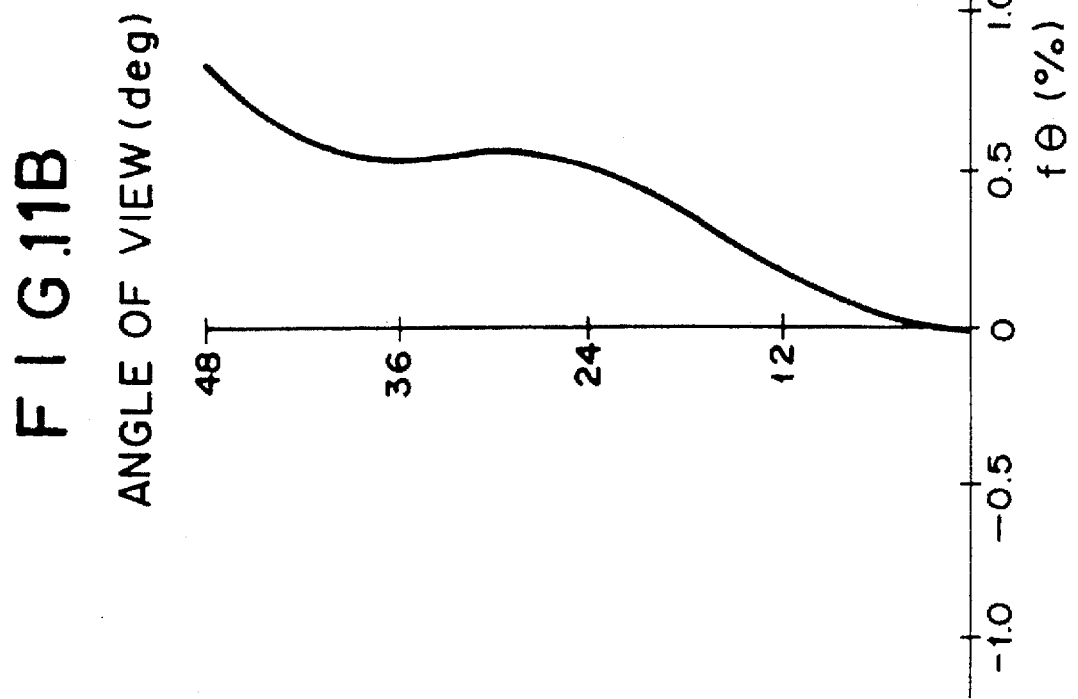
FIG. 11B is a view showing fθ characteristic of the condenser optical system of the ninth embodiment.
Figure 11A:
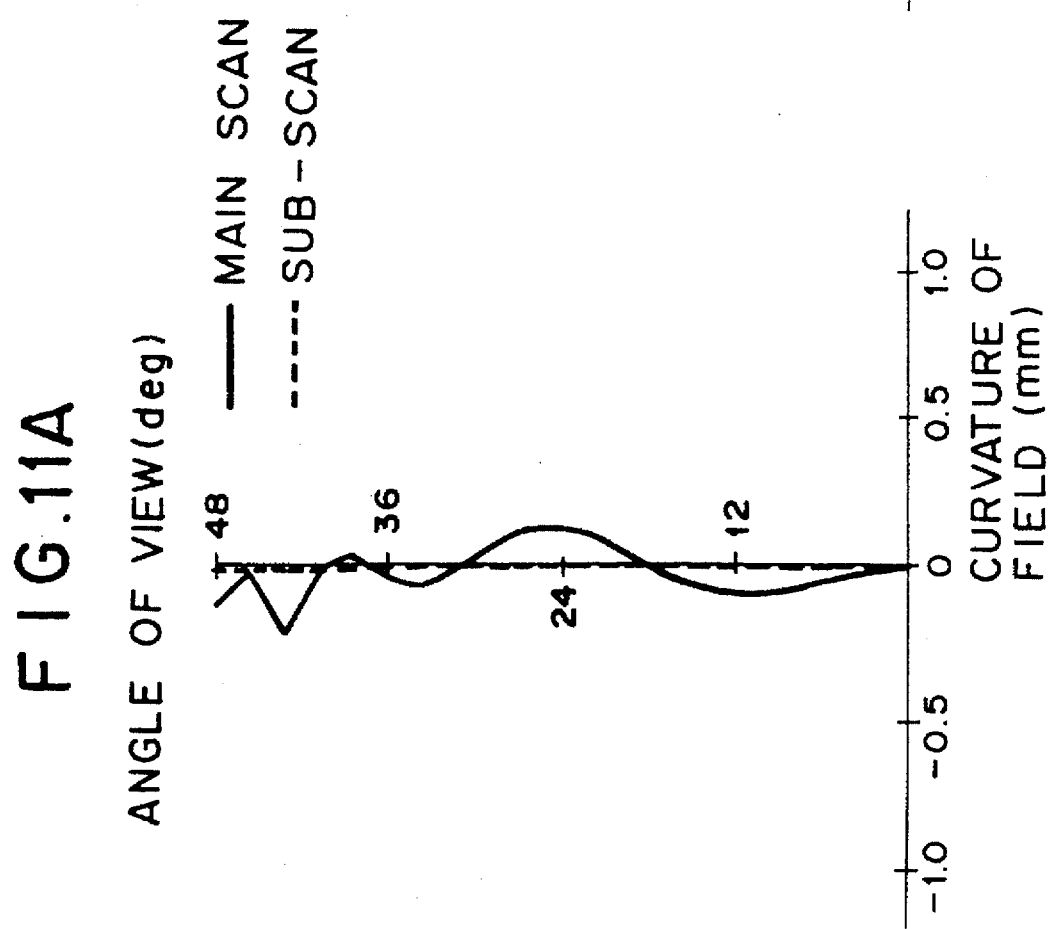
FIG. 11A is a view showing the curvature of field of the condenser optical system of the ninth embodiment.

FIGS. 11A and 11b respectively show the curvature of field and the fθ characteristics of the condenser optical system of this embodiment. As can be understood from FIGS. 11A and 11B, the optical system of this embodiment is well corrected in aberration.

FIGS. 4A to 11B showing aberrations of the second to ninth embodiment are only for the positive scanning angle range and the aberrations for the negative scanning angle range are symmetrical to those shown in the respective drawings relative to the line of 0°.

What is claimed is:

1. A condenser optical system for a light scanning system comprising a single lens for focusing a light beam deflected by a reflecting surface of a deflector onto a surface to be scanned and causing the deflected light to scan the surface in a main scanning direction at a constant speed, and a cylindrical mirror for compensating for surface tilt of the reflecting surface which has a refracting power only in a sub-scanning direction normal to the main scanning direction, wherein at least one surface of said single lens is toric to compensate for the surface tilt associated with the cylindrical mirror and the toric surface is aspheric in a main-scanning cross-section.

2. A condenser optical system as defined in claim 1 in which both the surfaces of said single lens are aspheric and the deflector side surface of said single lens is toric and convex toward the deflector in said main-scanning cross-section.

3. A condenser optical system as defined in claim 2 in which when the focal length of said single lens is represented by f, the radius of curvature of the deflector side surface of said single lens in said main-scanning cross-section as measured on the optical axis is represented by RX1, the axial surface separation between a deflecting point on said reflecting surface and said single lens is represented by d1, the axial thickness of said single lens is represented by d2 and the deflector side aspheric surface of said single lens has a shape defined by the following formula $$z=ch^2/[1+\{1-(1+K)c^2h^2\}^{1/2}]+a1h^4+a2h^6+a3h^8+a4h^{10} \quad (1)$$

wherein z represents the length of a perpendicular line between a point on an aspheric surface at a height of h above the optical axis and a plane tangent to the aspheric surface at the vertex of thereof (a plane perpendicular to the optical axis), h represents the height above the optical axis, c represents the curvature at the vertex of the aspheric surface (the reciprocal of the radius of curvature =1/RXi), K represents a conic constant and a1 to a4 respectively represents fourth-order, sixth-order, eighth-order and tenth-order aspheric coefficients, the following formulae (2) to (5) are satisfied, $$0.3 \leq d2/d1 \leq 0.7 \quad (2)$$

$$0.4f \leq RX1 \leq 2.5f \quad (3)$$

$$-3.0 \times 10/f^3 \leq a1 \leq -5.0/f^3 \quad (4)$$

$$7.0 \times 10/f^5 \leq a2 \leq 6.0 \times 10/f^5 \quad (5)$$

4. A condenser optical system as defined in claim 1 in which said single lens is of plastic.

5. A condenser optical system as defined in claim 4 in which said cylindrical mirror is of plastic.

6. A condenser optical system as defined in claim 5 in which the deflecting angle of the light beam is not smaller than 60°.

7. A condenser optical system as defined in claim 1 in which said cylindrical mirror is of plastic.

8. A condenser optical system as defined in claim 1 in which the deflecting angle of the light beam is not smaller than 60°.

* * * * *